(12) United States Patent
Chengalvarayan

(10) Patent No.: US 9,245,526 B2
(45) Date of Patent: Jan. 26, 2016

(54) DYNAMIC CLUSTERING OF NAMETAGS IN AN AUTOMATED SPEECH RECOGNITION SYSTEM

(75) Inventor: Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 3105 days.

(21) Appl. No.: 11/380,149

(22) Filed: Apr. 25, 2006

(65) Prior Publication Data

US 2007/0250320 A1  Oct. 25, 2007

(51) Int. Cl.
*G10L 15/00* (2013.01)
*G10L 15/26* (2006.01)

(52) U.S. Cl.
CPC .................... *G10L 15/26* (2013.01)

(58) Field of Classification Search
CPC ......... G10L 15/20; G10L 15/04; G10L 15/22; G10L 21/0208; G10L 25/78; G10L 15/005; G10L 15/08; G10L 15/26; G10L 2015/0631; G06F 17/27; G06F 17/2785; G06F 17/2715; G06F 17/2775; G06F 17/30734; G06F 17/241; G06F 17/2735; G06F 17/277; G06F 17/278; G06F 17/2795; G06F 17/2818; G06F 17/30654
USPC .......................... 704/245, 201, 251–255, 275
See application file for complete search history.

(56) References Cited

U.S. PATENT DOCUMENTS

| | | | | |
|---|---|---|---|---|
| 5,440,662 A * | 8/1995 | Sukkar | ................. | G10L 15/142 704/236 |
| 5,740,320 A * | 4/1998 | Itoh | ............... | 704/267 |
| 5,819,221 A * | 10/1998 | Kondo | .................... | G10L 15/18 704/245 |
| 5,835,893 A * | 11/1998 | Ushioda | .................. | G10L 15/18 704/10 |
| 5,860,063 A * | 1/1999 | Gorin | .................. | G10L 15/1815 704/245 |
| 5,862,519 A * | 1/1999 | Sharma et al. | ................ | 704/231 |
| 5,963,666 A * | 10/1999 | Fujisaki et al. | ................ | 382/187 |
| 6,178,396 B1 * | 1/2001 | Ushioda | ............. | G06F 17/2715 704/1 |
| 6,205,428 B1 * | 3/2001 | Brown et al. | ................. | 704/270 |
| 6,223,158 B1 * | 4/2001 | Goldberg | ...................... | 704/252 |
| 6,873,993 B2 * | 3/2005 | Charlesworth et al. | ............... | 1/1 |
| 6,934,680 B2 * | 8/2005 | Holzapfel | ...................... | 704/245 |
| 7,624,015 B1 * | 11/2009 | Rahim et al. | ............... | 704/256.5 |
| 7,881,935 B2 * | 2/2011 | Asano et al. | .................. | 704/252 |
| 2003/0177000 A1 * | 9/2003 | Mao | .................... | G06F 17/2715 704/9 |
| 2005/0143998 A1 * | 6/2005 | Ogawa | ........................ | 704/251 |
| 2006/0248026 A1 * | 11/2006 | Aoyama et al. | ................. | 706/12 |
| 2007/0118376 A1 * | 5/2007 | Mukerjee | .............. | G10L 15/063 704/245 |
| 2007/0136048 A1 * | 6/2007 | Richardson-Bunbury | ............. | G06F 17/2818 704/9 |
| 2007/0255552 A1 * | 11/2007 | Thiesson | ............. | G06F 17/3087 704/8 |

\* cited by examiner

*Primary Examiner* — Abdelali Serrou
(74) *Attorney, Agent, or Firm* — Anthony Luke Simon; Reising Ethington P.C.

(57) ABSTRACT

A speech recognition method includes receiving a nametag utterance, decoding the nametag utterance to recognize constituent subwords of the nametag utterance, determining the number of subwords in the nametag utterance, and associating the nametag utterance with one or more of a plurality of different nametag clusters based on the number of subwords in the nametag utterance. According to preferred aspects of the method, a confusability check is performed on the nametag utterance within the cluster(s) associated with the nametag utterance, stored nametags are received from memory by decoding the nametag utterance within the cluster(s) associated with the nametag utterance, and the stored nametags are played back by cluster.

20 Claims, 5 Drawing Sheets

| Shorter Cluster | Medium Cluster | Longer Cluster |
|---|---|---|
| John (JH AA N) | Voicemail (V OY S M EY L) | General Motors (JH EH N ER AH L M OW T ER Z) |
| Jeff (JH EH F) | Down Town (D AW N T AW N) | Post Office (P OW ST AO F AH S) |
| Home (HH OW M) | Cell Phone (S EH L F OW N) | Renaissance Center (R EH N AH S AA N S S EH N ER) |
*Fig. 5*
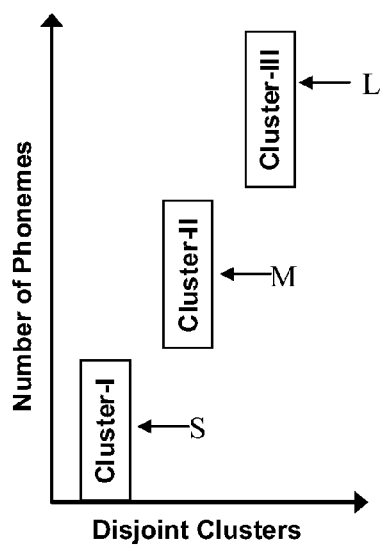
*Fig. 4*
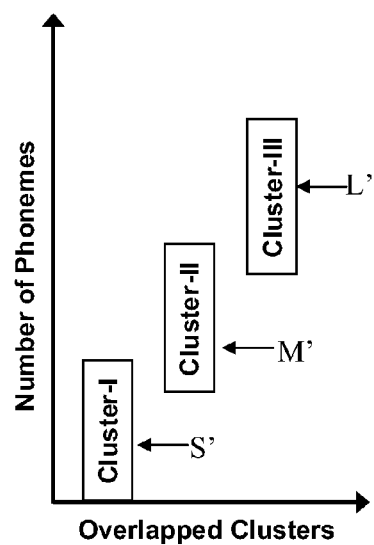
*Fig. 6*

DYNAMIC CLUSTERING OF NAMETAGS IN AN AUTOMATED SPEECH RECOGNITION SYSTEM

TECHNICAL FIELD

This invention relates to automated speech recognition (ASR) and, more particularly, to subword-based ASR.

BACKGROUND OF THE INVENTION

ASR technologies enable microphone-equipped computing devices to interpret speech and thereby provide an alternative to conventional human-to-computer input devices such as keyboards or keypads. For example, many telecommunications devices are equipped with voice dialing features to initiate a telecommunication session. Such voice dialing features are enabled by ASR technology to detect the presence of discrete speech such as a spoken control word like a numeral or keyword, or a spoken nametag. For example, ASR may be used to match a spoken nametag with a corresponding stored nametag saved in memory of the telecommunication device to identify user-defined information such as a person. More specifically, a user may initiate a telephone call by speaking a nametag associated with a personal contact stored in an electronic address book of the telecommunication device.

But one problem encountered with voice dialing is that of confusability between similar sounding nametags. For example, when a user speaks the nametag "John," ASR may confuse between a stored "John At Work" nametag and a stored "John" nametag. Therefore, before initially storing a new nametag, current voice dialing systems force the user to speak the new nametag in several different ways to enable a higher level of differentiation between already stored nametags. Unfortunately, however, this process repeats until the user says the new nametag in a way that is less likely to be confused with existing stored nametags. Accordingly, such repetition frustrates the user.

SUMMARY OF THE INVENTION

According to one aspect of the present invention, there is provided a speech recognition method comprising the steps of:
(a) receiving a nametag utterance;
(b) decoding the nametag utterance to recognize constituent subwords of the nametag utterance;
(c) determining the number subwords in the nametag utterance; and
(d) associating the nametag utterance with one or more of a plurality of different nametag clusters based on the number of subwords in the nametag utterance.

If desired, the speech recognition method can also include one or more of the following additional steps:
(e) performing a confusability check on the nametag utterance within the cluster(s) associated with the nametag utterance;
(f) associating the nametag utterance with one of a plurality of nametag templates based on a best score from the step of performing a confusability check and storing the one nametag template in memory;
(g) retrieving stored nametags from memory by decoding the nametag utterance only within those cluster(s) associated with the nametag utterance; or
(h) playing the nametags back by cluster.

BRIEF DESCRIPTION OF THE DRAWINGS

Preferred exemplary embodiments of the invention will hereinafter be described in conjunction with the appended drawings, wherein like designations denote like elements, and wherein:

FIG. 4 is a graph of exemplary mutually exclusive nametag clusters that can be used in accordance with the method of FIG. 3;

FIG. 5 is a table of exemplary nametags and corresponding phonemes grouped by cluster;

FIG. 6 is a graph of alternative exemplary overlapping nametag clusters that can be used in accordance with an alternative embodiment of the method of FIG. 3.

DETAILED DESCRIPTION OF THE PREFERRED EMBODIMENTS

Figure 1:
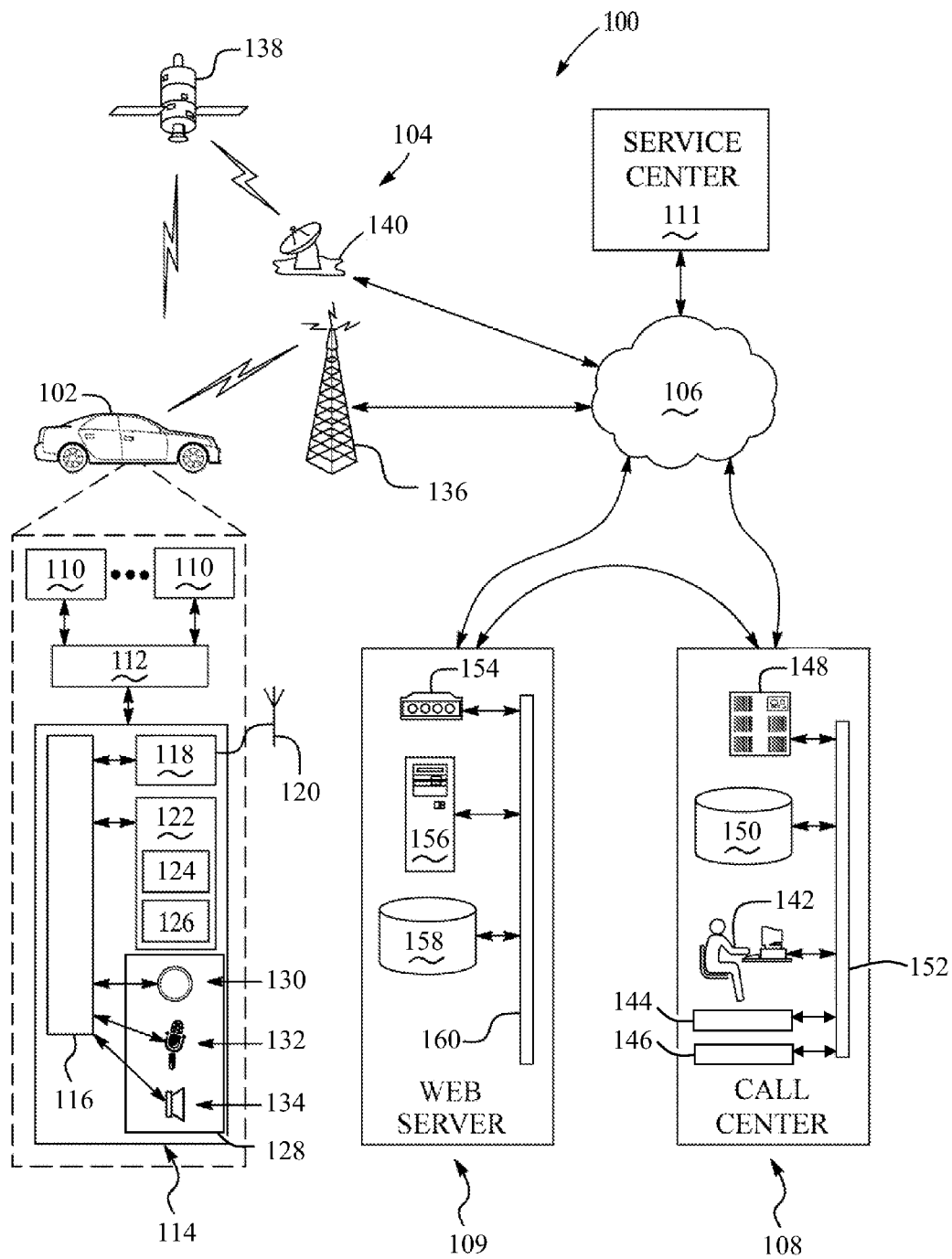
FIG. 1 is a block diagram depicting an example of a telematics system that can be used to implement exemplary methods of storing and retrieving nametags.
Figure 2:
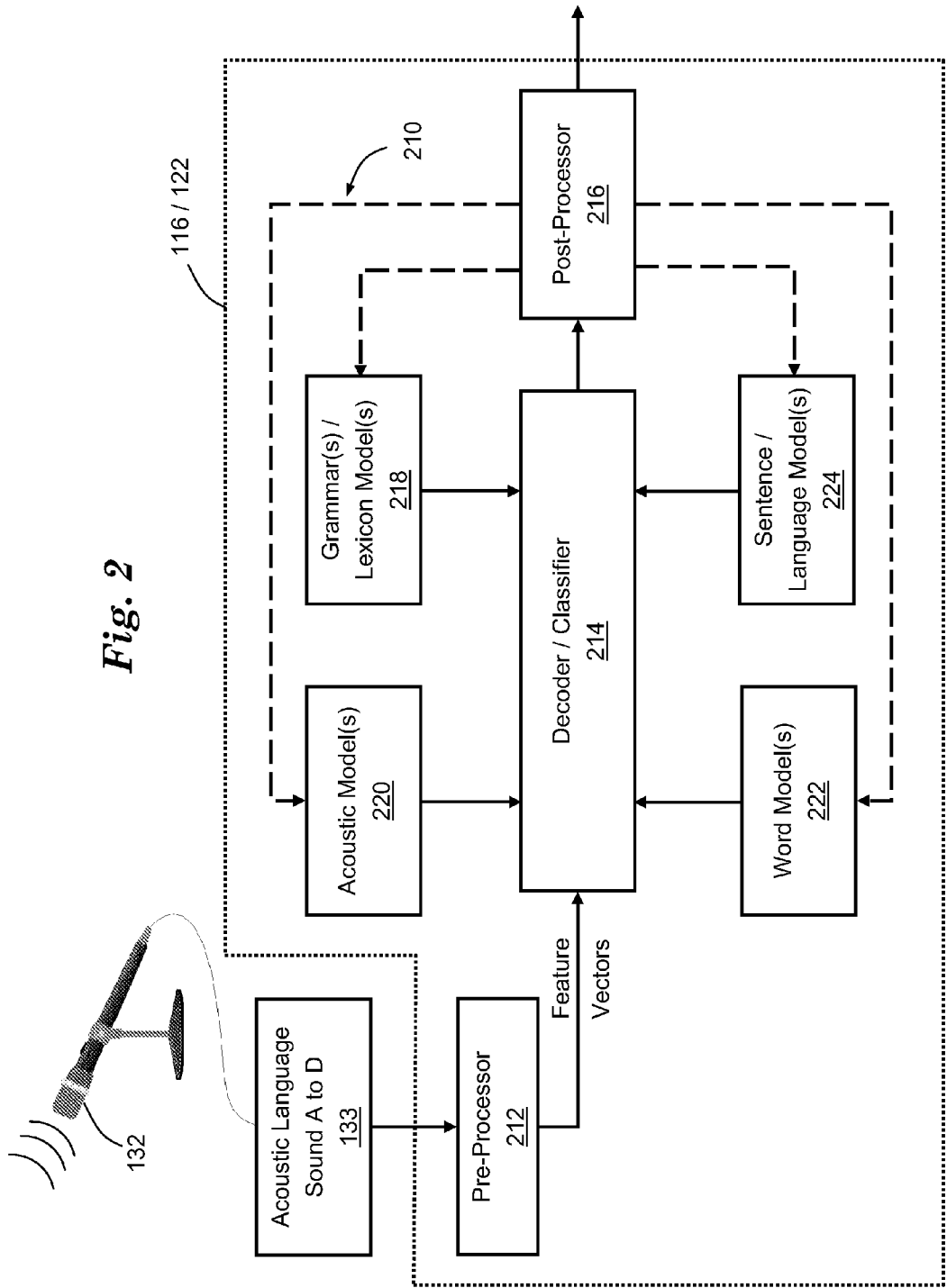
FIG. 2 is a block diagram illustrating an example ASR architecture that can be embedded within the telematics system of FIG. 1 and used to implement exemplary methods of storing and retrieving nametags.

An exemplary operating environment enabled with automated speech recognition (ASR) is illustrated in FIGS. 1 and 2, and can be used to implement exemplary embodiments of methods of dynamic clustering of speech recognition nametags. The methods can be particularly useful for voice dialing applications, voice activated web browsing applications, or the like. The methods can include clustering of nametags for efficient storage and retrieval of nametags, and are discussed in detail further below in conjunction with FIGS. 3 through 7.

The methods can be carried out using any suitable ASR-enabled system. Preferably, however, the methods are carried out in conjunction with an ASR-enabled telematics system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111. Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules can be located on the vehicle 102 and include one or more vehicle sub-systems or vehicle system modules (VSMs) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration, such as a Controller Area Network (CAN), Media Oriented System Transport (MOST), Local Interconnect Network (LIN), Ethernet (10 base T, 100 base T), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 executes one or more speech recognition programs and process speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording utterances or speech from a vehicle occupant via the user interface 128. The database 126 is used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PTSN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models, or the like.

ASR systems are generally known to those skilled in the art, and FIG. 2 illustrates an exemplary specific architecture for an ASR system 210 to provide exemplary context for the method described herein below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of the acoustic data into parametric representations such as acoustic features, a decoder software module 214 for decoding the acoustic features to yield digital subword or word output data corresponding to the input speech utterances, and a post-processor software module 216 for using the output data from the decoder module 214 for any suitable purpose, including providing training feedback to other ASR models.

One or more modules or models are used as input to the decoder module 214. First, grammar or lexicon model(s) 218 provide rules governing which words can logically follow other words to form valid sentences. In a broad sense, a grammar also defines a universe of vocabulary the system expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the utterances into electrical signals and communicates such signals to the acoustic interface 133. A sound-responsive element in the microphone 132 captures the user's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters, such as time-varying feature vectors, from within each frame. Utterances within the user's speech can be represented as sequences of these feature vectors. For example, and as known to those skilled in the art, 39 feature vectors can be extracted and can include, for example, vocal pitch, energy profiles, and/or spectral attributes, or cepstral coefficients that are obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process the incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Models (HMM).

Hidden Markov Models are known those skilled in the art and produce multiple speech recognition hypotheses of the acoustic input which hypotheses are considered in ultimately identifying that recognition output which represents the most probable correct decoding of the acoustic input. More specifically, an HMM is a statistical model that yields an "N-best" list of subword hypotheses ranked according to HMM-calculated confidence values or probabilities of an observed sequence of acoustic data given one or another subword, such as by the application of Bayes' Theorem. A Bayesian HMM process identifies the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. To identify words, individual HMM's for a sequence of subwords can be concatenated to establish word HMM's.

Methods of Dynamic Clustering of Nametags

A method of dynamic clustering of nametags is provided herein and can be carried out using the architecture of the ASR system 210 within the operating environment of the telematics system 100 described above. Those skilled in the art will also recognize that the method can be carried out using other ASR systems within other operating environments.

In general, a user can choose to store nametags into the speech recognition system 210 for later retrieval and use by the user. For example, a nametag can be a person's name stored as a personal contact in a user's electronic address book. In a discrete speech storage mode of the ASR system 210, the user inputs a spoken nametag into the system 210 by vocalizing a nametag utterance into the microphone 132. In the system 210, the nametag utterance is first pre-processed, then decoded, and subsequently checked for confusability before being stored in the memory 122.

More specifically, the pre-processor module 212 divides the nametag utterance into its acoustic constituent subwords, which is then further subdivided into a constituent series of feature vectors. Then the speech recognition decoder 214 receives and processes the feature vectors using suitable acoustic models and algorithms to generate an N-best list of nametag templates.

As used herein, the term templates is interchangeable with models, waveforms, reference patterns, exemplars, hypotheses, or other types of references. A template can include a series of feature vectors representative of a word or subword and can be based on particular speakers, speaking styles, and audible environmental conditions. Those skilled in the art will recognize that templates may be generated by suitable template training of the ASR system and stored in memory. Those skilled in the art will also recognize that stored templates may be manipulated, wherein parameter values of the templates are adapted based on differences in speech input signals between template training and actual use of the ASR system. For example, a set of templates trained for one ASR user or certain acoustic conditions may be adapted and saved as another set of templates for a new ASR user or new acoustic conditions, based on a limited amount of training data from the new user or the new acoustic conditions. In other words, the templates are not necessarily fixed and may be processed during speech recognition.

It may be desirable to evaluate multiple nametag templates considering that some syllables or phonemes are easily confused with other syllables or phonemes. Accordingly, the nametag templates are then processed by the decoder module 214 using a confusability check to make sure the nametag utterance and/or its associated nametag template(s) are not too easily confused with any already stored nametags, before storing the nametag utterance to memory as a newly stored nametag. If the nametag utterance, via one or more nametag templates, is too easily confused with already-stored nametags, then the nametag template(s) may not be stored and the user may be prompted to retry.

Confusability checks are well known to those skilled in the art and reflect the fact that a certain component of speech can be confused with a similar component such as the confusion of the sounds "q" and "u" or "m" and "n". Confusability checks also receive as input circumstantial conditions such as environmental noise and speaker based variables like speaker gender or dialect that affect an incoming voice signal and affect differentiation of various speech components. One example of a confusability check including confusion tables and matrices is disclosed in U.S. patent application Ser. No. 11/336,081 filed Jan. 20, 2006, which is incorporated by reference herein in its entirety.

Figure 3:
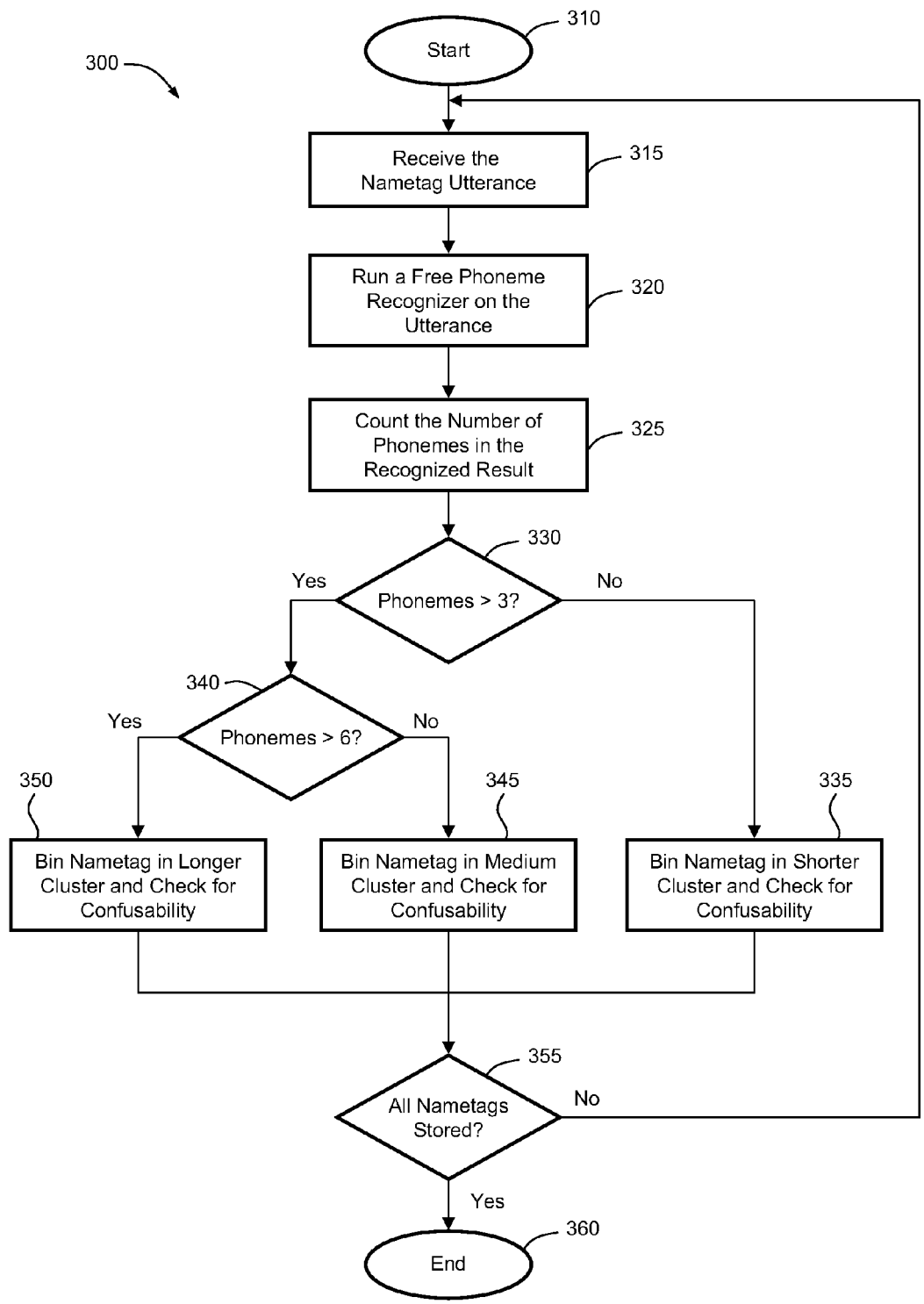
FIG. 3 is a flow chart of an embodiment of an exemplary nametag storing method, which can be carried out using the telematics system and ASR architecture of FIGS. 1 and 2.
Figure 7:
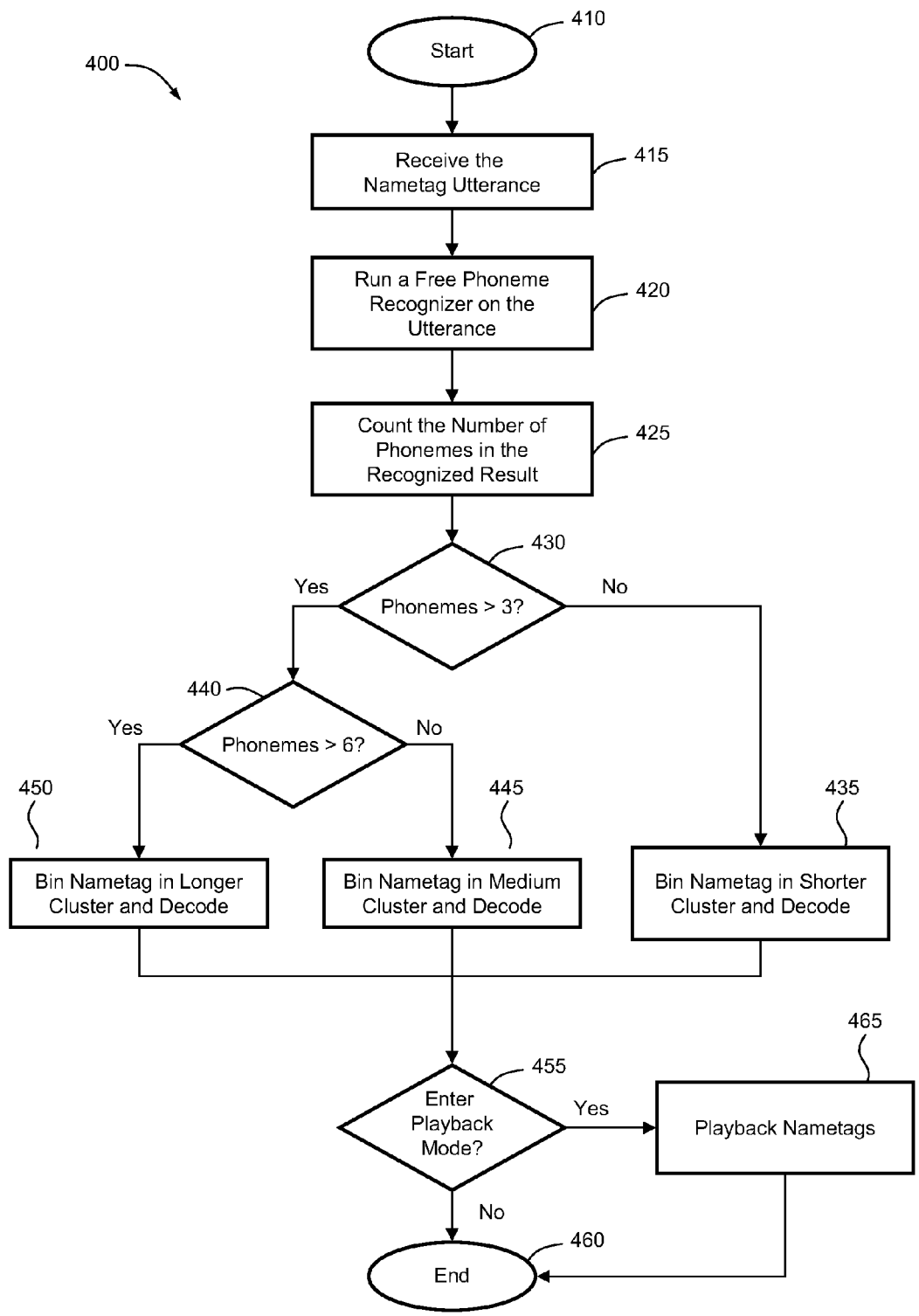
FIG. 7 is a flow chart of an embodiment of an exemplary nametag retrieval method, which can be carried out using the telematics system and ASR architecture of FIGS. 1 and 2 and the exemplary graphs and tables of FIGS. 4 through 6.

Nametag storage and retrieval performance may be improved by establishing a plurality of nametag clusters and carrying out speech processing functions within just one of the nametag clusters or within a subset of the nametag clusters. In general, nametags are grouped into a plurality of different nametag clusters, confusability checks are performed within the different nametag clusters when storing the nametags, and then nametag retrieval can be performed within the individual nametag clusters. Performance can be improved because the confusability checks and retrievals can run much faster within just one or two nametag clusters than across an entire population of nametags. FIGS. 3 and 7 illustrate exemplary methods of dynamic clustering of nametags, as discussed in detail below.

Improved Nametag Storage

FIG. 3 illustrates an exemplary method of storing nametags in nametag clusters 300. At step 310, a vehicle user starts interaction with the user interface of the telematics unit 114, preferably by depressing the user interface pushbutton 130 to begin a session in which the user inputs voice commands that are interpreted by the telematics unit 114 while operating in a nametag storing speech recognition mode. Using the speaker 134, the telematics unit 114 acknowledges the pushbutton activation by playing a sound or providing a verbal request for a command from the user or occupant. The telematics unit 114 preferably receives voice input, or further pushbutton input, to request certain desired functionality from the telematics unit 114. For example, the telematics unit 114 can receive a voice instruction such as "Store Nametag" from an occupant via the user interface microphone 132. Thereafter, the system acknowledges the voice command and prompts the user to say a nametag to be stored.

At step 315, the ASR-enabled telematics unit 114 receives the nametag utterance from the user, such as through the user interface microphone 132.

At step 320, the nametag utterance is processed by the telematics unit 114 using a free phoneme recognizer to recognize subwords, such as phonemes, that define the nametag. As used herein, the term nametag includes a single nametag and/or one or more nametag templates. Those skilled in the art will recognize that nametag templates are alternative representations of a given nametag.

At step 325, the number of recognized phonemes in the utterance are determined. According to one technique of free phoneme recognizing and counting, multiple templates and template weighting or analyzing schemes can be used to determine the number of phonemes to be used for further processing. For example, if the nametag is characterized by more than one nametag template, then the average number of phonemes across the multiple nametag templates can be used for the phoneme count and the number need not be an integer. As another example, the number of phonemes in a highest ranking or otherwise best template of multiple templates can be used for the phoneme count. Multiple templates and template weighting schemes in conjunction with a free phoneme recognizer are disclosed in the above-noted U.S. patent application Ser. No. 11/336,081.

In steps 330 and 340, the number of recognized phonemes in the nametag utterances is compared to predetermined threshold quantities, and in steps 335, 345, 350 the nametag utterances are associated with appropriate nametag clusters based on the number of phonemes present in the nametags. In other words, one or more of the nametag clusters are selected based on the results of the comparison. Any suitable number of different clusters is used and each cluster can be defined by nametags having any suitable number of phonemes. As just one example of multitudes of possibilities, three mutually exclusive nametag clusters can be used such as "shorter," "medium," and "longer" clusters, S, M, L, as shown in FIG. 4. FIG. 5 shows exemplary spoken nametags and corresponding phoneme sequences in parentheses, arranged according to shorter, medium, and longer clusters.

At step 330, if the number of phonemes associated with a nametag is less than four (or not greater than three), then that nametag is binned into the shorter cluster as shown at step 335. Otherwise, the method proceeds to step 340.

At step 340, if the number of phonemes associated with a nametag is greater than three, but less than seven (or not greater than six), then that nametag is binned into the medium cluster at step 345. If, however, the number of phonemes associated with a nametag is greater than six, then that nametag is binned into the longer cluster at step 350.

At step 355, it is determined whether all nametags that the user desires to store have been stored. If not, then the method loops back to step 315 to retrieve another nametag and the process repeats. If so, then the method ends at step 360.

FIG. 6 illustrates exemplary overlapping shorter, medium, and longer nametag clusters S', M', L'. Here if the number of phonemes associated with a nametag is less than four, then that nametag is binned into the shorter cluster S'. Also if the number of phonemes associated with a nametag is greater than two and less than seven, then that nametag is binned into the medium cluster M'. And if the number of phonemes associated with a nametag is greater than five, then that nametag is binned into the longer cluster L'. According to this example, nametags having three phonemes will be binned into the shorter and medium clusters S', M', and nametags having six phonemes will be binned into the medium and longer clusters M', L'.

Referring again to FIG. 3, once a particular nametag is binned into an appropriate cluster in steps 335, 345, or 350, a confusability check is performed on that nametag within that particular cluster. Because the speed of a confusability check is at least partially dependent on the total quantity of stored nametags being checked, and because the quantity of other nametags within the checked cluster is potentially less than an entire population of stored nametags in the system 210, the confusability check within a given cluster potentially can be performed faster than if the confusability check was carried out for the entire population of stored nametags. In other words, confusability checking within less than all of the clusters is faster than across the entire population of nametags defined by all stored nametags within all of the clusters.

Also, this clustering technique enables more nametags to be stored than would otherwise be possible. In a conventional nametag storing process, only one or the other of the similar nametags "John" and "John At Work" could be stored in the system. Such nametags would likely not pass a confusability check because the initial portions of the nametags are identical. In other words, if the nametag "John" was already stored in the system, the nametag utterance "John At Work" would not likely pass a confusability check because it is so similar to "John". With the clustering technique, however, both "John" and "John At Work" can both be stored as nametags because the similar shorter and longer nametag utterances are binned into separate clusters and separately tested for confusability. For example, when "John At Work" is being tested for confusability within the longer cluster, "John At Work" cannot be rejected for confusability with the stored nametag "John" because "John" is not present in the longer cluster.

Improved Nametag Retrieval

FIG. 7 illustrates an exemplary method of retrieving nametags in nametag clusters 400. After a nametag utterance is binned, checked for confusability, and then stored, the user uses the recognition mode of the recognition system to recognize the nametag for some useful purpose such as dialing a telephone number associated with the nametag. At step 410, the vehicle user initiates a voice dialing speech recognition mode such as by depressing the user interface pushbutton 130. Using the speaker 134, the telematics unit 114 acknowledges the pushbutton activation by playing a sound or providing a verbal request for input from the user.

At step 415, the telematics unit 114 receives a voice instruction including a command and nametag such as "Call John" from an occupant via the user interface microphone 132. Thereafter, the telematics unit 114 acknowledges the voice command and nametag utterance, access an associated stored nametag, and allow the telematics unit 114 to dial a telephone number associated with the stored nametag. But first, the utterance is pre-processed and decoded as follows.

First, at step 420, the nametag utterance is processed by the telematics unit 114 using a free phoneme recognizer to recognize the phonemes that define the nametag.

At step 425, the number of recognized phonemes in the utterance is determined in any suitable manner as discussed above with reference to step 325.

At steps 430 and 440, the number of recognized phonemes is compared to predetermined threshold quantities, and in steps 435, 445, and 450 the nametags are associated with appropriate nametag clusters based on the quantity of phonemes present in the nametags. Again, any suitable number of different clusters can be used and each cluster can be defined by nametags having any suitable number of phonemes. But the number of clusters and the number of phonemes associated therewith are preferably identical to that described above with respect to steps 335, 345, and 350. Therefore, if the number of phonemes associated with a nametag is less than four (or not greater than three), then that nametag is binned into the shorter cluster(s) S, S'. If the number of phonemes associated with a nametag is greater than three but less than seven (or not greater than six), then that nametag is binned into the medium cluster(s) M, M'. If, however, the number of phonemes associated with a nametag is greater than six, then that nametag is binned into the longer cluster(s) L, L'.

At steps 435, 445, 450, after a particular nametag utterance to be recognized is binned into or associated with an appropriate cluster, additional speech decoding is performed on that nametag utterance within that particular cluster to correctly match the nametag utterance to its corresponding stored nametag associated with that same particular cluster. This additional decoding within a given cluster potentially can be performed faster and more accurately than if the decoding was carried out for the entire population of nametags stored in memory. The decoding can be faster because the speed of decoding is at least partially dependent on an entire population of stored nametags being referenced for recognition, and because the number of other nametags within the cluster is potentially less than the total quantity of stored nametags. In other words, decoding using less than all of the clusters is faster than if performed using all of the clusters. Also, in a conventional nametag decoding process, the first best result from an N-best list may not be the correct choice, and the rest of the N-best list may include results from the entire population of nametags. Having so many nametags considered in compiling the N-best list may unnecessarily dilute the likelihood scores of the list. With the clustering technique, however, potentially far fewer nametags would be considered in compiling the N-best list and, thus, may yield more refined and accurate N-best lists and final results.

According to one technique of nametag decoding by cluster, the phoneme count can be combined with likelihood scores to reorder the N-best list that was generated for the nametag utterance in order to make a final decision about the recognized results. For example, a nametag template with fewer phonemes and a lower likelihood score could be reordered above a nametag template having a higher likelihood score but more phonemes.

According to another technique of decoding within two or more clusters, the clusters could be weighted during decoding, such as by the average number of phonemes of the nametags stored within the clusters. For example, nametags within the shorter cluster can be weighed less in noisy conditions than nametags within the medium cluster.

After a nametag utterance is binned, checked for confusability, and then stored, the user can also use the recognition system to hear all of the stored nametags or just some of the stored nametags such as by cluster. In other words, the user can play the nametags back, by cluster. For example, as shown in step 455 the vehicle occupant or ASR user can initiate a nametag playback mode such as by depressing a user interface pushbutton 130 or by speaking a command such as "Playback Shorter Nametags" at an appropriate time and in an appropriate mode. In this case, the system processes such a command by executing those suitable data files that are associated with the shorter cluster and that contain acoustic recording data of uttered and stored nametags to thereby transmit audio to the user via a user interface or speaker. Otherwise, the method ends at step 460.

If so, however, then at step 465 the system acknowledges the voice command and plays back all of the nametags stored within the shorter cluster such as by executing a stored sound file of the user's recorded nametags and outputting the sound via the speaker 134. The user can also command the telematics unit 114 to play back all stored nametags, such as by playing the nametags in the shorter cluster(s) S, S' first and longer cluster(s) L, L' last, or by playing the nametags back chronologically by date and time when stored. Any suitable playback configuration can be used. When playback is complete, the method ends at step 460.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A speech recognition method comprising the steps of:
 (a) receiving a nametag utterance via a microphone associated with an automatic speech recognition system;
 (b) decoding the nametag utterance to recognize constituent subwords of the nametag utterance using at least one processor associated with the automatic speech recognition system;
 (c) determining the number of subwords in the nametag utterance;

(d) associating the nametag utterance with one or more of a plurality of different nametag clusters based on the number of subwords in the nametag utterance;
(e) storing an associated nametag in memory, as representing the nametag utterance, among a plurality of stored nametags; and
(f) playing stored nametags back by cluster.

2. The method of claim 1 wherein the associating step (d) includes associating the nametag utterance with less than all of the plurality of different nametag clusters based on the number of subwords in the nametag utterance.

3. The method of claim 2 wherein the associating step (d) includes associating the nametag utterance with no more than two of the plurality of different nametag clusters based on the number of subwords in the nametag utterance.

4. The method of claim 3 wherein the associating step (d) includes associating the nametag utterance with only one of the plurality of different nametag clusters based on the number of subwords in the nametag utterance.

5. The method of claim 1 wherein step (b) comprises generating multiple nametag templates and wherein the determining step (c) includes determining the number of subwords by analyzing the multiple nametag templates.

6. The method of claim 5, wherein the determining step (c) includes calculating an average number of subwords in the multiple templates.

7. The method of claim 5, wherein the determining step (c) includes using the number of subwords from a highest ranking template of the multiple templates.

8. The method of claim 1, wherein the associating step (d) includes comparing the number of subwords to at least one predetermined threshold number and selecting one or more of the plurality of different nametag clusters based on the results of the comparison.

9. The method of claim 1, further comprising the step of (e) performing a confusability check on the nametag utterance within the cluster(s) associated with the nametag utterance.

10. The method of claim 9, further comprising the steps of (f) associating a nametag with the nametag utterance based on a best score from the step of performing a confusability check and storing the associated nametag in memory as representing the nametag utterance.

11. The method of claim 10 further comprising the step of (g) retrieving a stored nametag from memory by:
receiving a second nametag utterance;
decoding the second nametag utterance to recognize constituent subwords of the second nametag utterance;
determining the number of subwords in the second nametag utterance;
associating the second nametag utterance with one or more of the plurality of different nametag clusters based on the number of subwords in the second nametag utterance; and
further decoding the second nametag utterance within the one or more of the plurality of different nametag clusters of the step of associating the second nametag utterance to correctly match the second nametag utterance to its corresponding stored nametag.

12. A speech recognition method comprising the steps of:
(a) receiving a nametag utterance via a microphone associated with an automatic speech recognition system;
(b) decoding the nametag utterance to recognize constituent subwords of the nametag utterance using at least one processor associated with the automatic speech recognition system;
(c) determining the number of subwords in the nametag utterance;
(d) associating the nametag utterance with one or more of a plurality of different nametag clusters based on the number of subwords in the nametag utterance;
(e) performing a confusability check on the nametag utterance within the cluster(s) associated with the nametag utterance;
(f) associating a nametag with the nametag utterance based on a best score from the step of performing a confusability check and storing the associated nametag in memory, as representing the nametag utterance, among a plurality of stored nametags;
(g) retrieving a stored nametag from memory by:
receiving a second nametag utterance via a microphone;
decoding the second nametag utterance to recognize constituent subwords of the second nametag utterance;
determining the number of subwords in the second nametag utterance:
associating the second nametag utterance with one or more of the plurality of different nametag clusters based on the number of subwords in the second nametag utterance; and
further decoding the second nametag utterance within the one or more of the plurality of different nametag clusters of the step of associating the second nametag utterance to correctly match the second nametag utterance to its corresponding stored nametag; and
(h) playing stored nametags back by cluster.

13. The method of claim 1 further comprising the step of retrieving a stored nametag from memory by decoding the nametag utterance within the cluster(s) associated with the nametag utterance.

14. The method of claim 13, further comprising the step of calculating scores reflecting the likelihood that nametag templates match the nametag utterance within the cluster(s) associated with the nametag utterance to yield an N-best list ordered by likelihood scores.

15. The method of claim 14, further comprising the step of associating one of the nametag templates with the nametag utterance based on a best score from the likelihood scores.

16. The method of claim 14, further comprising the step of weighting the likelihood scores with the subword count to reorder the N-best list.

17. The method of claim 13, wherein the associating step (d) includes associating the nametag utterance with at least two of the plurality of different nametag clusters based on the number of subwords in the nametag utterance, and the decoding includes weighting the nametags within the clusters differently.

18. The method of claim 17, wherein the nametags are weighted by the average number of subwords within each of the clusters.

19. A speech recognition method for a telematics system that has a speech recognition system, the method comprising the steps of:
(a) receiving a nametag utterance via a microphone associated with an automatic speech recognition system;
(b) decoding the nametag utterance using a free subword recognizer to recognize constituent subwords of the nametag utterance using at least one processor associated with the automatic speech recognition system;
(c) determining the number of subwords in the nametag utterance;
(d) associating the nametag utterance with one or more of a plurality of different nametag clusters based on the number of subwords in the nametag utterance;

(e) performing a confusability check on the nametag utterance within the cluster(s) associated with the nametag utterance;

(f) associating the nametag utterance with one of a plurality of nametag templates based on a best score from the step of performing a confusability check and storing the one of the plurality of nametag templates in memory;

(g) retrieving stored nametags from memory by decoding the nametag utterance only within those cluster(s) associated with the nametag utterance; and (h) playing the stored nametags back by cluster.

20. A speech recognition method for a vehicle having a telematics unit with an embedded speech recognition system, the method comprising the steps of:

(a) receiving a nametag utterance via a microphone associated with an automatic speech recognition system;

(b) decoding the nametag utterance using a free phoneme recognizer to recognize constituent phonemes of the nametag utterance using at least one processor associated with the automatic speech recognition system;

(c) determining the number of phonemes in the nametag utterance;

(d) associating the nametag utterance with one or more of a plurality of different nametag clusters based on the number of phonemes in the nametag utterance;

(e) performing a confusability check on the nametag utterance within the cluster(s) associated with the nametag utterance;

(f) associating the nametag utterance with one of a plurality of nametag templates based on a best score from the step of performing a confusability check and storing the one nametag template in memory;

(g) retrieving stored nametags from memory by decoding the nametag utterance only within those cluster(s) associated with the nametag utterance, comprising the substeps of:

receiving a second nametag utterance;

decoding the second nametag utterance to recognize constituent subwords of the second nametag utterance;

determining the number of subwords in the second nametag utterance;

associating the second nametag utterance with one or more of the plurality of different nametag clusters based on the number of subwords in the second nametag utterance; and further decoding the second nametag utterance within the one or more of the plurality of different nametag clusters of the step of associating the second nametag utterance to correctly match the second nametag utterance to its corresponding stored nametag; and (h) playing the stored nametags back by cluster.

* * * * *